(12) United States Patent
Bowker (10) Patent No.: US 10,738,462 B2
(45) Date of Patent: Aug. 11, 2020

(54) DECK CONNECTOR

(71) Applicants: PDMM Limited, as Trustee of the PDMM Trust, Tauranga (NZ); Paul Innes Bowker, Tauranga (NZ)

(72) Inventor: Paul Innes Bowker, Tauranga (NZ)

(73) Assignee: PDMM Limited, as Trustee of the PDMM Trust, Tauranga (NZ)

( * ) Notice: Subject to any disclaimer, the term of this patent is extended or adjusted under 35 U.S.C. 154(b) by 0 days.

(21) Appl. No.: 16/349,247

(22) PCT Filed: Nov. 9, 2017

(86) PCT No.: PCT/NZ2017/050146
§ 371 (c)(1),
(2) Date: May 10, 2019

(87) PCT Pub. No.: WO2018/088914
PCT Pub. Date: May 17, 2018

(65) Prior Publication Data
US 2019/0284796 A1    Sep. 19, 2019

(30) Foreign Application Priority Data

Nov. 10, 2016 (NZ) .................................... 726159

(51) Int. Cl.
| | | |
|---|---|---|
| *E04B 1/38* | (2006.01) | |
| *E04B 1/41* | (2006.01) | |
| *E04B 1/00* | (2006.01) | |
| *E04F 15/02* | (2006.01) | |
| *F16B 43/02* | (2006.01) | |
| *E04F 15/14* | (2006.01) | |

(Continued)

(52) U.S. Cl.
CPC ................ *E04B 1/40* (2013.01); *E04B 1/003* (2013.01); *E04F 15/02* (2013.01); *E04F 15/02044* (2013.01); *E04F 15/14* (2013.01); *F16B 5/0614* (2013.01); *F16B 43/025* (2013.01); *E04F 2015/0205* (2013.01); *E04F 2015/02094* (2013.01); *E04F 2015/02122* (2013.01); *F16B 5/0072* (2013.01); *F16B 5/02* (2013.01)

(58) Field of Classification Search
CPC ... E04B 1/40; E04B 1/003; E04F 2015/02094
See application file for complete search history.

(56) References Cited

U.S. PATENT DOCUMENTS 4,925,141 A    5/1990 Classen
5,027,573 A *  7/1991 Commins et al. ........... 52/489.2
(Continued)

FOREIGN PATENT DOCUMENTS

AU    201713569 S    6/2017
EP    3088631 A1 *  11/2016

OTHER PUBLICATIONS

EP3088631A1_Machine_Translate.pdf (Year: 2016).*
(Continued)

*Primary Examiner* — Babajide A Demuren
(74) *Attorney, Agent, or Firm* — Christensen O'Connor Johnson Kindness, PLLC (57) ABSTRACT

The invention relates to a deck connector for aligning adjacent decking members, such as deck boards, at a set distance from each other and for attaching the decking members to a support member, such as a joist.

15 Claims, 8 Drawing Sheets

(51) Int. Cl.
*F16B 5/06* (2006.01)
*F16B 5/02* (2006.01)
*F16B 5/00* (2006.01)

(56) References Cited

U.S. PATENT DOCUMENTS

| | | |
|---|---|---|
| 6,402,415 B1 | 6/2002 | Eberle, III |
| D573,454 S | 7/2008 | Eberle, III |
| D839,723 S | 2/2019 | Bowker |
| 2009/0217495 A1* | 9/2009 | Tipps et al. ............ A44B 21/00 24/458 |
| 2013/0025230 A1* | 1/2013 | Turner ..................... E04B 5/12 52/586.1 |
| 2014/0366334 A1 | 12/2014 | Gamble et al. |

OTHER PUBLICATIONS

International Search Report dated Jan. 15, 2018, issued in corresponding application No. PCT/NZ2017/050146, filed Nov. 9, 2017, 4 pages.

Written Opinion dated Jan. 15, 2018, issued in corresponding application No. PCT/NZ2017/050146, filed Nov. 9, 2017, 8 pages.

\* cited by examiner

DECK CONNECTOR

BACKGROUND

Technical Field

The present disclosure generally relates to a deck connector for use in attaching decking members to a support member.

Description of the Related Art

Deck connectors may be used to attach decking members, such as deck boards, to support members, such as joists. Typically, a deck connector is located between adjacent deck boards. An inner edge of each deck board may engage with one or more projecting spikes of the deck connector to attach the deck connector to the deck board. The deck connector also typically comprises a system by which the deck connector can be attached to a joist. For example, the deck connector may comprise an aperture through which a screw can be located.

However, the design of some types of deck connectors can make it difficult to access the screw in order to effectively and easily attach the deck connector to a joist or other support member. Furthermore, known deck connectors require a fastener, such as a screw, to be fixed to the top of a joist, which is then exposed to the weather and particularly to wet conditions, which may cause corrosion of the screw or deterioration of the surrounding timber.

Another disadvantage with known deck connectors is that it can be difficult for the connectors to hold the deck boards under sufficient tension over time so that substantially even tension is applied across all deck boards of a deck that are attached to support members.

It is an object of the invention to provide a deck connector that goes at least some way towards overcoming the disadvantages of the prior art or that at least provides the public with a useful alternative.

BRIEF SUMMARY

The systems and devices described herein have innovative aspects, no single one of which is indispensable or solely responsible for their desirable attributes. Without limiting the scope of the claims, some of the advantageous features will now be summarized.

In a first aspect, the invention provides a deck connector comprising: a body configured to space adjacent decking members apart, wherein the body comprises a first end and a second end, a first side and a substantially opposing second side, and front and rear surfaces spanning between the first and second sides of the body, wherein the body further comprises a connection aperture configured to extend downwardly from the front surface of the body toward the rear surface of the body; and a first flange projecting beyond the first side of the body and a second flange projecting beyond the second side of the body, wherein the flanges are provided at or near the first end of the body.

Preferably, the connection aperture is configured to extend downwardly from the front surface of the body toward the rear surface of the body so as to extend at an angle relative to the flanges. Preferably, the flanges are substantially perpendicular to the body of the deck connector.

In one form, at least one pin projects from the rear surface of the body. Preferably, the pin comprises an upper surface that is angled downwardly in a direction from the first end of the body toward the second end and outwardly away from the rear surface of the body.

Preferably, the connection aperture is located at or near the second end of the deck connector body. In one form, the connection aperture is located in a boss located at or near the second end of the body. In one form, the boss is substantially cylindrical and the connection aperture is substantially centrally located within the boss.

Preferably, the deck connector comprises at least two pins projecting from the rear surface of the body.

Preferably, the at least one pin comprises at least one outwardly projecting surface that slopes in a direction from the first end of the deck connector to the second end.

Preferably, the body is substantially planar along at least a portion of its length. In one form, the body is substantially planar along its entire length.

Preferably, the deck connector comprises a substantially oblong flanged plate at its first end, and wherein the first or second flanges of the deck connector form first and second sides of the plate. The sides of the plate overhang at least a portion of the sides of the deck connector body. Preferably, the body of the deck connector is connected to a lower surface of the flanged plate along a virtual centre line that extends from a first end of the flanged plate to a second, substantially opposing end of the flanged plate. In one form, the flanged plate comprises a substantially elliptical, planar plate.

In one form, the deck connector body comprises: a spine having a first end that forms the first end of the deck connector body and a second end; a fastener region located at the second end of the spine and in which the connection aperture is located; and a skeg located beneath the fastener region. Preferably, the skeg lies in substantially the same vertical plane as the spine. The spine, fastener region and skeg each have a rear surface and wherein the rear surfaces of the spine, fastener region and skeg lie in substantially the same vertical plane. In one form, the deck connector body comprises a boss connected to the spine and in which the connection aperture is located. In one form, the fastener region comprises a boss that extends downwardly at an angle between the front and rear surfaces of the deck connector. Optionally, the boss comprises a front surface and a substantially opposing rear surface and the connection aperture extends between the front and rear surfaces of the boss, and wherein the connection aperture has a substantially elliptical profile at the front surface of the boss and a substantially circular profile at the rear surface of the boss.

In one form, the front surface of the boss comprises a substantially flat central region located between two side regions, wherein each of the two side regions is angled away from the central region. Preferably, each side region is angled from the central region at an angle of about 3°.

Preferably, the deck connector is formed from plastic or glass reinforced nylon. In one form, the deck connector, including its components parts, is formed by injection moulding.

The deck connector may further comprises a skeg that extends beneath the boss. In one form, the body of the deck connector and the boss and skeg each comprise a rear surface that lies substantially in the same plane.

In a second aspect, the invention provides a method of attaching a pair of decking members to a support member using a deck connector, wherein the method comprises the steps of: (a) providing a pair of first and second decking members, each decking member comprising a substantially horizontal groove along a longitudinal edge of the decking member; (b) placing the first and second decking members in a side by side arrangement above two or more support members so as to be supported by the support members and so that the grooved edges of the decking members face each other; (c) using a deck connector according to the first aspect of the invention to attach the decking members to one of the support members by inserting the first flange of the deck connector into the groove of the first decking member and pushing rear surface of the deck connector body against the support member; (d) inserting a fastener through the angled connection aperture of the deck connector and driving the fastener into the support member at an angle to pull the first decking member down against the support member; and (e) pushing the second decking member against the deck connector so that the second flange of the deck connector is located within the groove of the second decking member.

Preferably, the fastener is driven into the support member at an angle of approximately 30 to 45° from horizontal.

Preferably, the fastener may comprise a screw.

In one form, at least one pin projects outwardly and downwardly from the rear surface of the deck connector and wherein the step of driving the fastener into the support member at an angle, drives the at least one pin of the first decking member into the support member.

Embodiments of systems, components and methods of assembly and manufacture will now be described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made.

Terms such as "top", "bottom", "upper", "lower", "front", "back", "left", "right", "rear", and "side" describe the orientation and/or location of portions of the components or elements within a consistent but arbitrary frame of reference which is made clear by reference to the text and the associated drawings describing the components or elements under discussion. Moreover, terms such as "first", "second", "third", and so on may be used to describe separate components. Such terminology may include the words specifically mentioned above, derivatives thereof, and words of similar import.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

DETAILED DESCRIPTION

Referring to FIGS. 1 to 16, the invention relates to a deck connector 100 for attaching decking members 300, such as deck boards to a support member, such as a joist. The deck connector 100 is configured to be located between a pair of adjacent decking members 300 and comprises projecting flanges 121a, 121b configured to engage with grooves 310 formed on inner side edges of the decking members 300. The deck connector 100 also comprises a connection aperture 140 through which a fastener 200, such as a screw, bolt, or the like, may be inserted to attach the deck connector 100, and therefore the engaged decking members 300, to a support member or joist 400.

In one form, as shown in FIGS. 1 to 8, the deck connector 100 comprises a body 110 configured to be located between a pair of adjacent decking members 300 and to space the adjacent decking members apart by at least the width of the body 110. The body 110 (and therefore its components) comprises a first end, forming an upper end during use, and a second end, forming a lower end during use. The body 110 also comprises substantially opposing first 111 and second 112 side surfaces. The first and/or second side surfaces 111, 112 may be substantially flat and smooth or the surfaces may be textured. In one form, the first and/or second side surfaces 111, 112 may comprise a substantially corrugated region. The body 110 also comprises a front surface 113, which may be provided on a front edge of the body 110, and a substantially opposing rear surface 114, which may be provided on a rear edge of the body 110. In other words, the front and rear surfaces 113, 114 may each span the distance between the first and second sides 111, 112 of the body 110 at the front and rear of the deck connector 100. The distance between the first and second sides 111, 112 of the body forms the width or thickness of the body 110.

In one form, the body comprises a spine 115 and a fastener region 130 that lies adjacent to the spine 115. The fastener region 130 may be connected to or integrally formed with the spine. At least one connection aperture 140 is located in the fastener region 130. In one form, the width or thickness of the body 110 or spine 115 is between 3 mm and 10 mm. For example, the thickness of the body or spine may be 4 mm. In one form, the thickness of the body 110 or spine 115 may be dimensioned to determine the gap between adjacent decking members 300. For example, if the thickness of the body 110 is about 4 mm and adjacent decking members 300 are positioned to press against the sides 111, 112 of the body 110 or the spine 115, the gap between the decking members will be about 4 mm. In other forms, the distance between distal ends of the projecting flanges of the deck connector 100 and the depth of the grooves 310 in the decking members 300 will determine the gap between adjacent decking members 300.

The rear surface 114 of the body 110 may comprise one or more pins 150 that project from the rear surface and that are configured to be embedded into a support member or joist 400 when the deck connector 100 is in use. In one form, as illustrated best in FIGS. 2 to 4, and 7, the deck connector comprises a pair of pins 150. However, in other forms, the deck connector may comprise a single pin, three pins, or more. Each pin 150 may project from the rear surface 114 of the body 110. Preferably, one or more of the pin(s) projects from the rear surface to a distance of between about 1 mm to about 5 mm from the rear surface. However, in other forms, one or more pins may project from the rear surface at a distance greater than 5 mm. In one form, at least one pin 150 of the deck connector 100 projects at a distance of around 1.5 mm from the rear surface of the body 110. In one form, one or more of the pins 150 is angled downwardly, or at least comprises one or more surfaces that are angled downwardly in a direction from the first end of the connector 100 to the second end. In one form, each pin 150 comprises an upper surface 151 that projects outwardly away from the rear surface 114 of the body 110 and that is angled downwardly in a direction from the first end of the body 110 toward the second end. Each pin 150 is configured to space the deck connector 100 away from a support member 400 when the deck connector is first held against the support member. As a screw or other type of fastener 200 is located within the connection aperture 140 of the deck connector and is screwed, or otherwise embedded into the support member, the downwardly angled pins 150 may pierce the support member 400 and may also become at least partially embedded in the support member 400. The angle of the fastener and the pin(s) help to pull the deck boards 300 in a horizontal and downward motion as the pins seat into the support member, in effect pulling the deck board down against the support member 400 and retaining tension in both the deck connector and the fastener. Once the rear surface of the deck member is substantially seated against the support member, after the pins are substantially embedded in the support member, the pins help hold the deck connector 100 in place by reducing the ability of the deck connector 100 to rotate relative to the support member 400. The angled fastener 200 and pins 150 apply downward pressure to the deck boards 300 engaged with deck connector 100 and hold the deck boards 300 and deck connector 100 under tension. By increasing the size of the one or more pins 150, the tension force will also increase.

A pair of first and second flanges 121a, 121b may project from the body 110 at or near the first end of the body 110 to engage with grooves or channels located on side edges of adjacent deck board 300a, 300b. For example, the flanges may project from one end (the upper end) of the spine 115. In one form, the deck connector 100 comprises a seat, which may be in the form of a flanged plate 120 located at the first end of the deck connector body 110. The seat or plate 120 comprises a first flange 121a that projects beyond the first side surface 111 of the body 110 or spine 115 and a second flange 121b that projects beyond the second side surface 112 of the body 110 or spine 115.

The seat/flanged plate 120 may be of any suitable shape. Preferably, the shape of the seat is selected so that the maximum distance between the distal ends of each flange 121a, 121b and the respective side surface 111, 112 of the body 110 is substantially equivalent. In a preferred form, the seat 120 is of a substantially oblong, regular shape. For example, in one form, as shown in FIGS. 5, 11 to 14 and 16, the seat is in the form of a flanged plate 120 that comprises a substantially elliptical shape. Preferably, the seat or flanged plate 120 has a substantially equal thickness across the whole of the seat/plate or at least across a substantial portion of the flanges 121a, 121b. Preferably, upper and lower surfaces of each flange are substantially flat. In other forms, the upper and/or lower surfaces of each flange may be corrugated. In one form, the upper and/or lower surfaces of each flange may be textured. For example, one or both of the upper and lower surfaces may be roughened or may be provided with a grid-like or stippled texture to allow for better grip and engagement between the flanges 121a, 121b and the grooves 310 of the decking members 300. In yet another form, the upper and or lower surfaces of the flanges may comprise a series of ribs. In the embodiment shown in FIG. 16, the lower surface of the seat flanges comprise a series of ribs substantially extending along the length of the seat.

The spine 115 and therefore also the body 110 of the deck connector 100 may be connected to a lower surface of the seat 120. In one form, a virtual centre line runs from a first end of the seat 120 to a second end of the seat 120 and the first end of the body 110/spine 115 connects to the seat 120 along the centre line.

Where the flanges 121a, 121b form part of a seat, such as a flanged plate 120, the body 110 may be configured to provide additional support to the flanged plate 120. For example, the front surface 113 at least a portion of the body may angle outwardly toward a front edge of the flanged plate 120, as shown best in FIGS. 1, 3, and 4 to increase the surface area where the body 110 connects to the flanged plate 120.

Because the flanges 121a, 121b are configured to engage with grooves 310 provided on inner edges of adjacent decking members 300, the thickness of the flanges 121a, 121b should be less than the width of the grooves 310 provided in the decking members 300. Preferably, each flange 121a, 121b is of a substantially consistent thickness throughout. The thickness of the first flange 121a may also be substantially equivalent to the thickness of the second flange 121b. Each flange preferably extends substantially perpendicularly to the body of the deck connector.

A connection aperture 140 extends between the front and rear surfaces of the deck connector body and is configured to receive a fastener 200 to attach the deck connector 100 to a support member 400 or joist. The connection aperture 140 may be provided at any suitable location on the body of the deck connector 100 to attach the deck connector to the support member. Preferably, the connection aperture 140 is provided at or near the second end of the body 110 or deck connector. In another form, the connection aperture is provided substantially centrally along the vertical length of the deck connector.

In one form, the body 110 may comprise a thickened or enlarged fastener region 130 in which the connection aperture 140 may be located. For example, in the embodiment shown in FIGS. 1 to 7, an enlarged fastener region 130 in the form of a boss is located at the second end of the body 110 and is connected to/joined to the spine 15 of the body. At least one connection aperture 140 is located within the boss 130. The boss 130 may be of any suitable regular or irregular shape that comprises sufficient dimensions for the connection aperture 140 to be located within the boss 130. In one form, the boss 130 is substantially cylindrical. Preferably, the connection aperture 140 is substantially centrally located within the cylindrical boss 130. In another form, the boss 130 is located near the second end of the body 110, as shown in FIGS. 11 to 15, or the boss 130 may be substantially centrally located on the body 110. In yet another form, the body 110 may be sufficiently thick or the fastener may be sufficiently narrow in diameter to allow the connection aperture 140 to be located within the body 110 without requiring a boss 130 or other substantially enlarged area of the body 110 in which the connection aperture 140 may be located. Although in preferred forms, the deck connector comprises a single connection aperture 140 for receiving a single fastener 200, it is envisaged that in other forms, the deck connector 100 may comprise two or more connection apertures 140 for receiving two or more fasteners 200.

Figure 1:
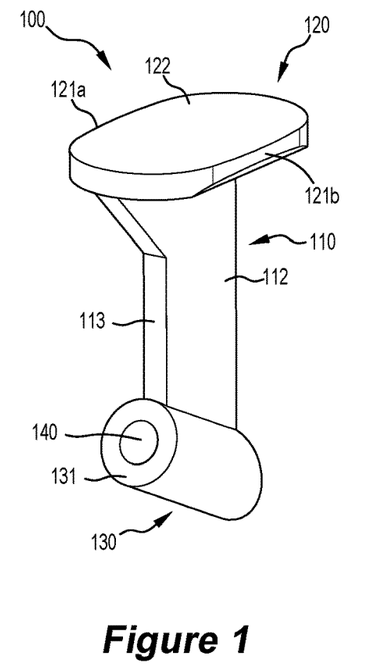
FIG. 1 is a front perspective view of one form of deck connector according to the present invention.
Figure 2:
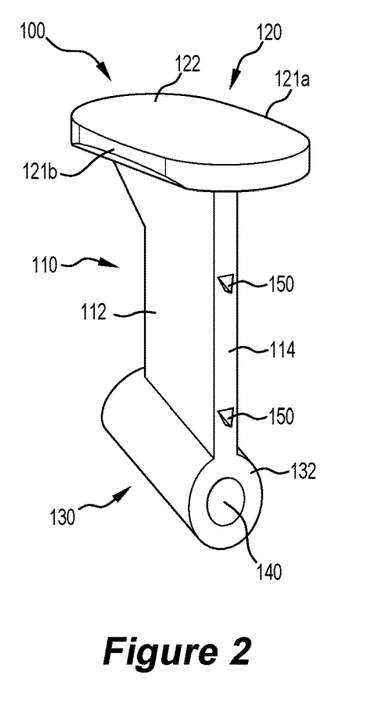
FIG. 2 is a rear perspective view of the deck connector of FIG. 1.
Figure 3:
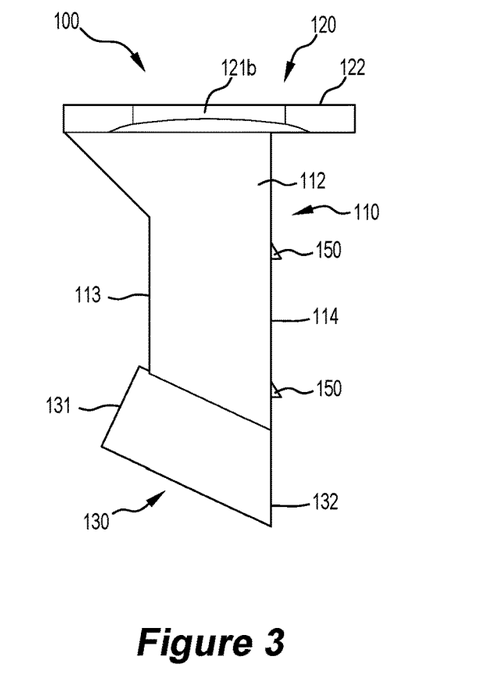
FIG. 3 is a left side view of the deck connector of FIG. 1.
Figure 4:
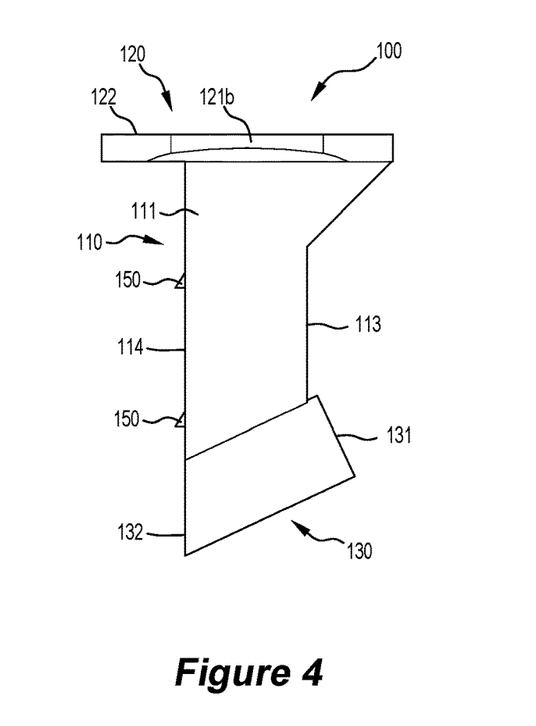
FIG. 4 is a right side view of the deck connector of FIG. 1.
Figure 5:
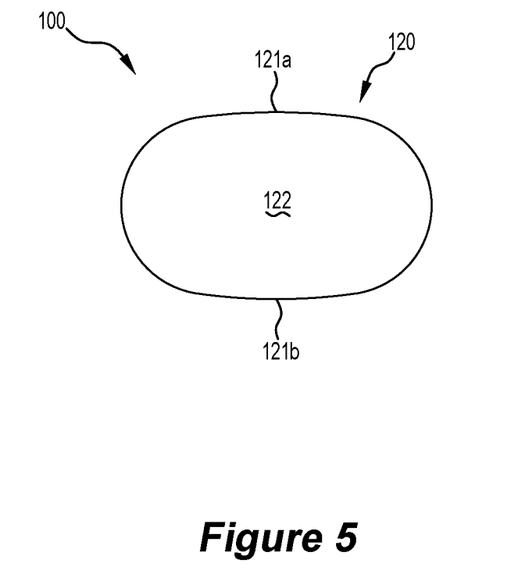
FIG. 5 is a top view of the deck connector of FIG. 1.
Figure 6:
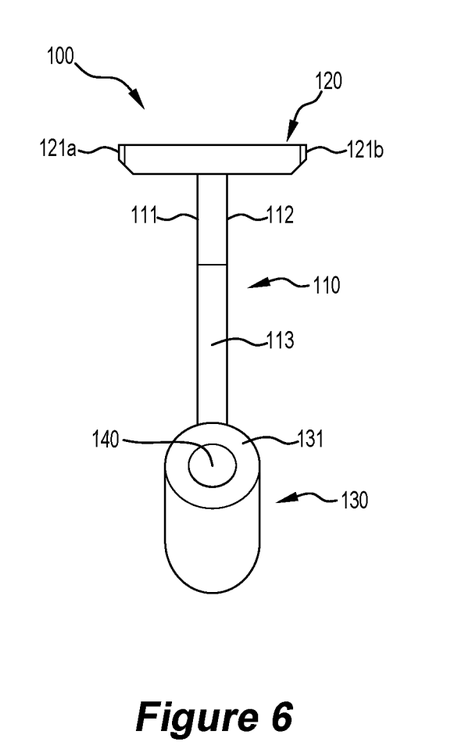
FIG. 6 is a front view of the deck connector of FIG. 1.
Figure 7:
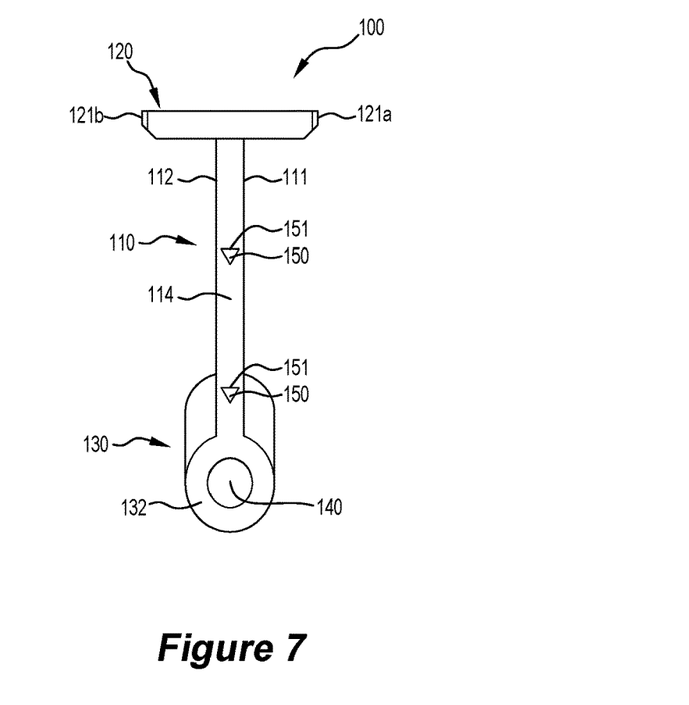
FIG. 7 is a rear view of the deck connector of FIG. 1.
Figure 8:
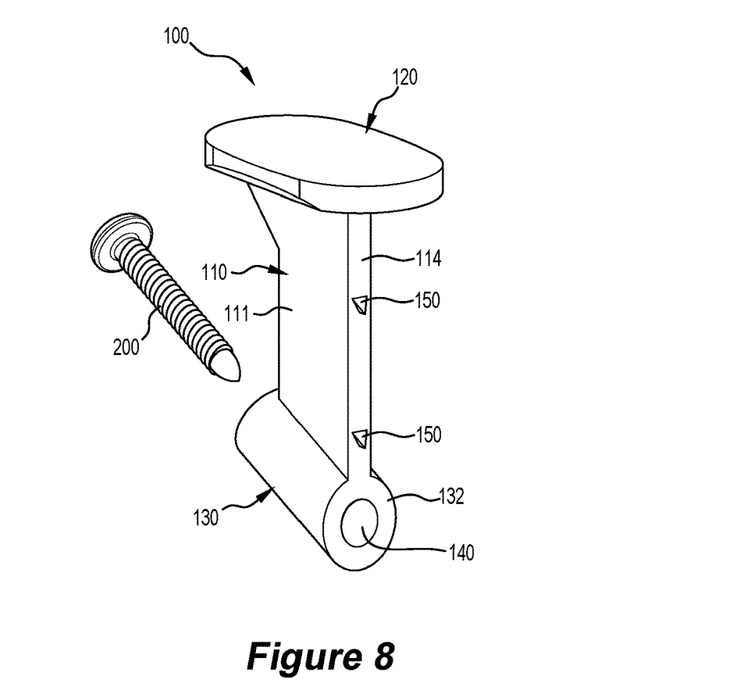
FIG. 8 is a rear perspective view of one form of deck connector of the invention with a fastener inserted into the connection aperture of the deck connector.

In one form, the connection aperture 140 extends downwardly from the front surface 131 of the boss toward the rear surface 132 of the boss in a direction from the first end of the deck connector to the second end of the deck connector, as shown in FIG. 8. Where the deck connector 100 comprises a boss 130 to support the connection aperture 140, the boss 130 may also extend downwardly from the front 113 to rear surface 114 of the deck connector. By providing a connection aperture 140 that extends downwardly toward the rear surface 114 of the deck connector body 110, a fastener located 200 within the connection aperture 140 is caused to angle downwardly also. As the fastener 200 is driven into a support member 400, such as a joist, the angled downwardly orientation of the fastener 200 pulls the deck connector 100 downward and onto the joist until the rear surface of the deck connector contacts the joist 400. The flanges 121a, 121b of the deck connector are held within grooves of decking members 300, such as deck boards, that sit on top of the joist 400. Therefore, as the fastener 200 pulls the deck connector body 110 downwardly so that the rear surface of the deck connector body contacts the side of the joist 400, the flanges 121a, 121b of the decking members are also pulled down and held under tension. In this way, the decking members 300 are tightly held against the joist 400 and help to provide the deck with a substantially flat top surface. Pins 150 on the rear surface of the deck connector 100 may be embedded in the surface of the joist 400 as the fastener 200 is tightened. The pins 150 help to hold the deck connector 100 in place, so that it is difficult for the deck connector to twist. Where the pins 150 have a downwardly angled profile, such as a downwardly angled upper surface 151, the pins also help pull the deck connector 100 down onto the joist to hold the flanges 121a, 121b of the deck connector under tension. The decking members with which the flanges 121a, 121b of deck connector are engaged are therefore also held under tension.

Preferably, the front surface 131 of the boss 130 substantially aligns with the front surface of the spine and the rear surface of the boss substantially aligns with the rear surface of the spine. Preferably, the connection aperture 140 (and optionally also the boss) are angled at approximately 30 to 45° from horizontal. In yet another form, the connection aperture 140 may extend substantially horizontally between the front and rear surfaces of the deck connector so as to lie substantially parallel with the flanged plate or seat 120.

In one form, the aperture 140 may be substantially round. In another form, as shown in FIGS. 11 to 14, the connection aperture 140 may be substantially elliptical. Preferably, the connection aperture 140 has a substantially elliptical profile at the front surface of the deck connector body 110 or boss 130 and a substantially round/circular profile at the rear surface of the deck connector body 110 or boss 130. By providing a wider, elliptical connection aperture 140 at the front surface of the fastener region 130, a fastener 200, such as a screw, can be driven into the connection aperture 140 at a slight angle from one side (i.e. without needing to be driven exactly perpendicularly into the aperture) by a left-handed or right-handed person. The elliptical connection aperture 140 therefore introduces a degree of tolerance that makes it easier for a user to attach the deck connector 100 to a support member 400/joist.

In one form, as shown in FIGS. 11, 13, 15, and 16, the front surface 131 of the fastener region, or boss 130, may comprise a substantially central region 131a located between two side regions 131b, 131c. The central region 131a may be a substantially flat surface and each of the two side regions 131b, 131c may be chamfered or angled away from the central region 131a. In this arrangement, the front surface 131 of the fastener region may form an arrow head shape with the nose of the arrow (the central region 131a) being substantially flat or blunt. Each side region 131b, 131c may be angled away from the central region 131a at any suitable angle, but is preferably orientated at an angle of between 2° and 10° from the central region 131a. In a preferred form, each side region 131b, 131c angles away from the central region 131a at an angle of about 3°. In this arrangement, a fastener 200, such as a screw, is caused to seat on the substantially flat central region 131a of the front surface 131 of the fastener region or boss 130, regardless of whether the fastener/screw 200 is driven into the connection aperture 140 perpendicularly or from the left or right side. In this arrangement, even if the fastener 200, such as a screw, is driven into the connection aperture 140 at an angle from one side, to attach the deck connector to a support member 400, such as a joist, the body of the deck connector 110 can remain substantially perpendicular to the joist and the rear surface 114 of the deck connector 100 can be pulled onto the adjacent surface of the joist by the fastener without causing the deck connector to skew substantially. The angled front surface 131 of the fastener region/boss 130 therefore helps to prevent the deck connector 100 from twisting when a fastener/screw 200 is driven into the deck connector off-centre.

In one form, as shown in FIGS. 11 to 16, the deck connector body 110 may also comprise a skeg or fin 160 that extends/projects beneath the fastener region, or boss 130, and that lies substantially in line with the spine 115. In this form, the connection aperture may be provided near the second end of the deck connector body 110 or substantially centrally along the vertical length of the deck connector body.

As described above in relation to the body of the deck connector, the skeg 160 may comprise one or more pins 150 that project from the rear surface 164 of the skeg. The skeg 160 helps prevent the deck connector 100 from skewing if the fastener is inserted into the connection aperture 140 and joist from one side. In one form, as shown, the skeg 160 comprises a front surface that extends beneath the front surface of the boss 130 and a rear surface that extends beneath the rear surface of the boss. In one form, as shown, the skeg 160 may be tapered toward its distal end. For example, the front surface of the skeg may slope toward the rear surface of the skeg to form a substantially triangular shape when viewed from one side. However, in other forms, the skeg may be of any suitable regular or irregular shape and configuration, such as a quadrilateral shape, a square shape, or rectangular shape, or a curved shape, for example, when viewed from one side. As above, one or more pins 150 may project from the rear surface of the skeg 160. In one form, each pin 150 comprises an upper surface 151 that projects outwardly away from the rear surface 164 of the skeg and that is angled downwardly in a direction from the first end of the body 110 toward the distal end 161 of the skeg. Each pin 150 is configured to space the deck connector 100 away from a support member 400 when the deck connector is first held against the support member. Again, as a screw or other type of fastener 200 is located within the connection aperture 140 of the deck connector and is screwed, or otherwise embedded into the support member, the downwardly angled pins 150 may pierce the support member 400 and may also become at least partially embedded in the support member 400.

The skeg 160 may help to ensure that the rear surface of the deck connector body 110 sits substantially flush with the surface of the support member/joist 400 to which the deck connector is attached. At times, the grain of the timber joist/support member 400 may cause a fastener 200, such as a screw, to deflect from the intended angle of insertion into the joist 400, such as by causing the screw 200 to angle upwardly. The upper and lower surfaces of the internal wall of the connection aperture 140 are preferably spaced from each other at a distance that is only slightly greater than the diameter of the fastener 200 (such as the diameter of the threaded portion of a screw) that passes through the connection aperture 140. Therefore, when the grain of the timber causes the screw 200 to deflect upward, the threaded body of the screw 200 presses against the walls of the connection aperture 140 and causes the deck connector 100 to tilt away from the joist 400, so that the first end of the deck connector is located farther away from the joist than the second end of the deck connector. The location of the skeg 160, beneath the connection aperture 140, limits the extent to which the deck connector 100 can tilt away from the joist 400. As the deck connector 100 is caused to tilt, the rear surface of the skeg 160 hits the joist 400 and prevents the deck connector from tilting back further. The screw 200 can then be driven into the joist 400 and, with the turning moment induced by the skeg 160 pressing against the joist 400, the screw 200 will pull the deck connector 100 back toward the desired position so that the rear surface of the deck connector body 110 sits substantially flush against the joist 400.

Therefore in a preferred form, the deck connector body comprises: a spine having a first end that forms the first end of the deck connector body and a second end; fastener region located at the second end of the spine and in which the connection aperture is located; and a skeg that is located beneath the fastener region.

In one form, the rear surface of the body 110 of the deck connector, including the spine 115, fastener region or boss 130, and the skeg 160 each lie in substantially the same vertical plane. In this form, the rear surface of the deck connector body, beneath the seat/flanged plate/flanged region, may be pushed up hard against a joist so that the side surfaces 111, 112 of the body (particularly the side surfaces of at least the spine 115) are substantially perpendicular to the joist.

The deck connector 100 may be made from any suitable material, such as a metal, alloy, or plastic material. In one form, the deck connector 100 may be formed from glass reinforced nylon. In one form, the deck connector may be injection moulded with plastic or co-moulded with a plastic/metal combination.

The decking members 300 (such as deck boards or panels for example), to be attached to a support member (such as a joist, beam, or support structure, for example), by a deck connector 100 of the invention each comprise first and second substantially opposing end edges 305, and first and second longitudinal side edges 306 that extend along the length of the decking member 300 between the first and second end edges 305. For the sake of convenience, the side edge 306 of a decking member 300 that is facing a deck connector 100 of the invention is referred to in this specification as an inner edge 306 of the decking member 300. However, it should be appreciated that a decking member 300 may be attached to a support member 400 by a pair of deck connectors 100, with one connector 100 being located on either side of the decking member 300. Furthermore, it is envisaged that a single decking member, such as a deck board 300 will be supported by two or more support members, such as joists 400. In such an arrangement, multiple deck connectors 100 may be located along each side edge 306 of the decking member 300 to attach each side of the decking member 300 to each joist 400.

Each groove 310 of a decking member 300 is preferably oriented to be substantially horizontal when the decking member 300 is oriented in a substantially horizontal position. Each groove 310 may be in the form of a continuous groove/channel that extends substantially along the length of at least one side edge 306 of a decking member 300. In another form, at least one groove 310 in the form of a slot may be formed on one or both side edges 306 of a decking member 300 at the location where the decking member is to be attached to a support member/joist 400 by a deck connector 100 of the present invention. The groove 310 may be formed with a router or using any other suitable tool or machinery.

Figure 9:
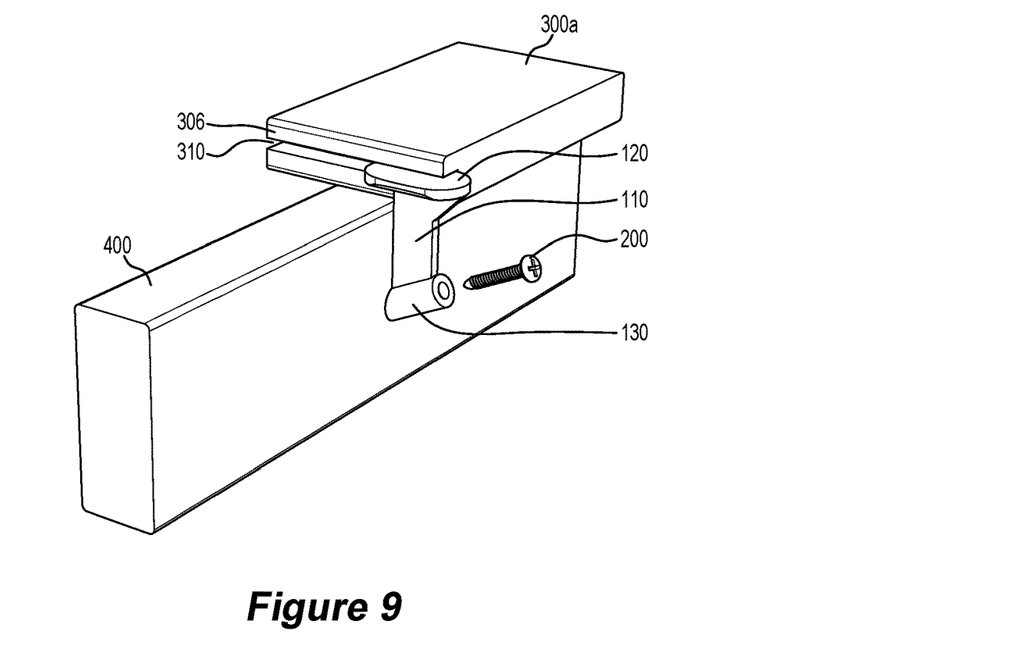
FIG. 9 shows one form of deck connector of the invention being used to attach a deck board to a joist.
Figure 10:
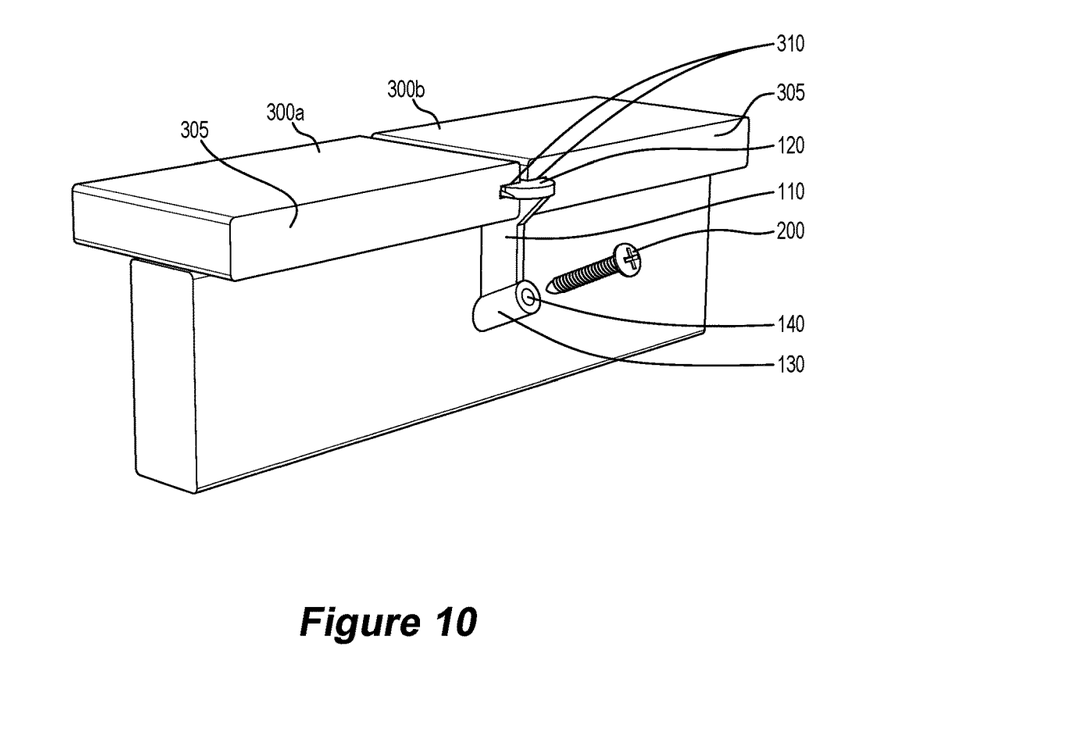
FIG. 10 shows the deck connector of FIG. 9 in situ between a pair of adjacent deck boards, but without a fastener in place to hold the deck connector and boards in position.
Figure 11:
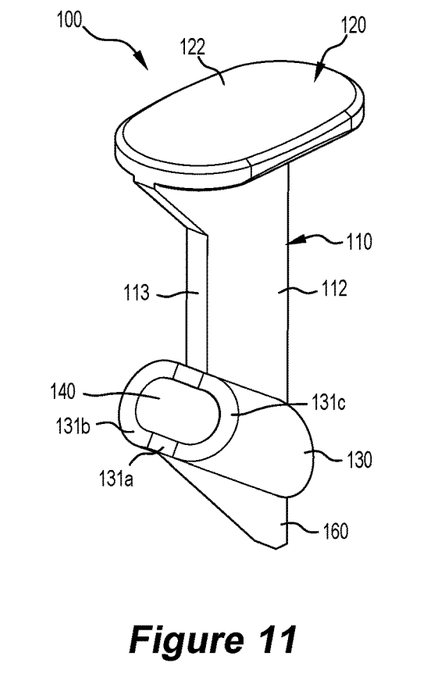
FIG. 11 is a front perspective view of another form of deck connector according to the present invention.
Figure 12:
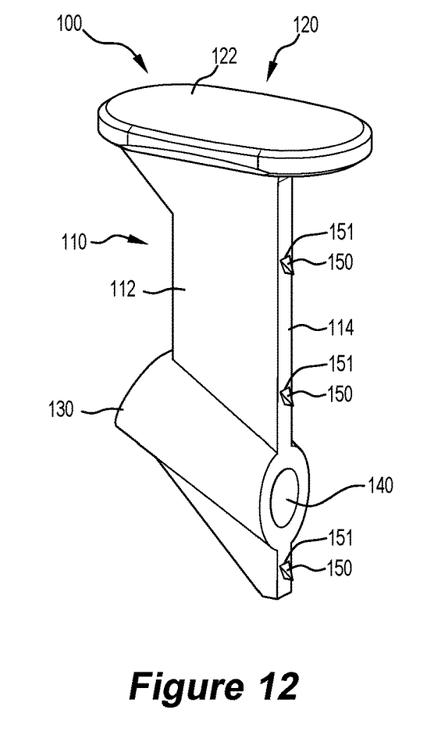
FIG. 12 is a rear perspective view of the deck connector of FIG. 11.
Figure 13:
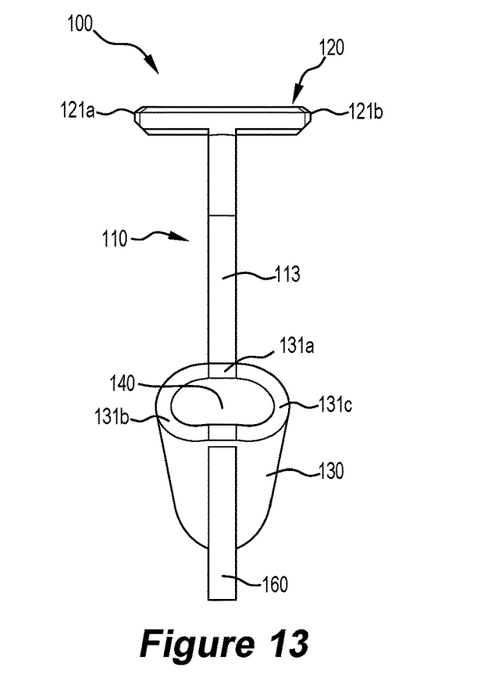
FIG. 13 is a front view of the deck connector of FIG. 11.
Figure 14:
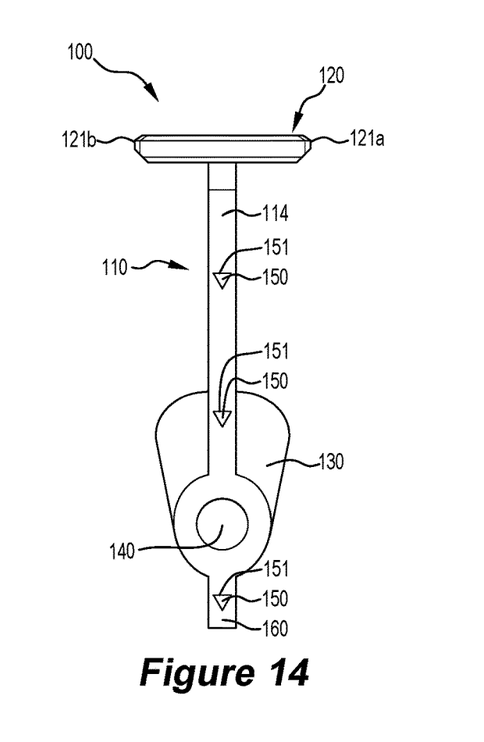
FIG. 14 is a rear view of the deck connector of FIG. 11.
Figure 15:
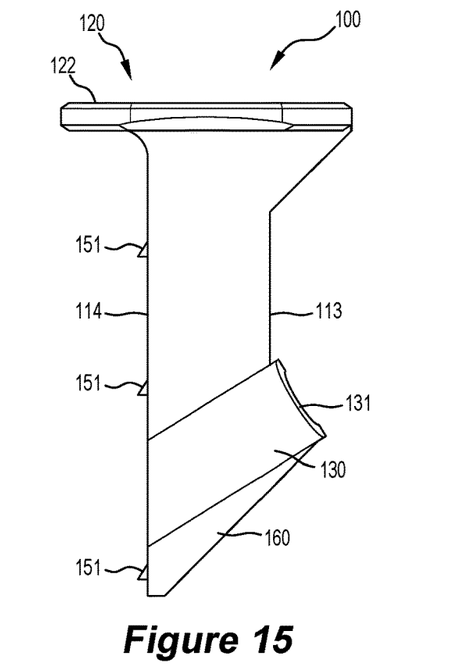
FIG. 15 is a side view of the deck connector of FIG. 11.
Figure 16:
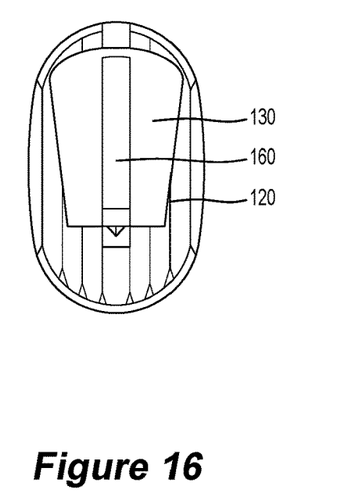
FIG. 16 is a bottom view of the deck connector of FIG. 11.

One possible method of using the deck connector 100 of the present invention to attach a pair of decking members, such as deck boards 300, to a support member, such as a joist 400, will now be described with reference to FIGS. 9 and 10.

Each deck board 300 to be attached to a joist 400 using a deck connector 100 of the invention must first be prepared, by providing a groove 310 on the inner side edges 306 of the deck board 300. The groove 310 may extend substantially along the length of the deck board 300 or multiple grooves 310 in the form of slots may be provided along the length of the deck board 300. The grooves 310 should be located in the areas where the deck board will overlie and be attached to a joist 400. The thickness of each groove 310 should be greater than the thickness of the flanges 121*a*, 121*b* of the deck connector 100. Preferably, each groove 310 should be of a thickness that is only slightly greater than the thickness of the deck connector flanges 121*a*, 121*b* to ensure a snug fit between the deck connector 100 and deck board 300. In one form, the thickness of each groove 310 may be substantially 4 mm.

The depth of each groove 310 should be sufficient to hold a substantial part of a respective deck connector flange 121*a*, 121*b* within the groove 310 without risk of the flange 121*a*, 121*b* pulling out of the groove 310. Preferably, each groove 310 should have a depth that is at least substantially equal to (or greater than), the projecting length of the respective flange 121*a*, 121*b*.

The deck boards 300 may be purchased in a pre-prepared form or the grooves 310 may be formed in the deck boards 300 using a router or other suitable tools or machinery.

A first deck board 300a is then placed in position across two or more joists 400.

(a) A deck connector 100 is then positioned next to one of the joists where the first deck board 300a and joist 400 intersect. One of the flanges of the deck connector 100, such as the first flange 121a, is pushed into the adjacent groove 310 on the inwardly facing edge 306 of the first deck board 300a to engage with the deck board 300a. The deck connector 100 is held firmly in the groove 310 and is simultaneously pushed against the joist 300.

(b) A fastener 200, such as a screw, nail, bolt, or the like, is placed within the connection aperture 140 of the deck connector 100 and is driven into the joist 400 to attach the deck connector 100, and therefore the first deck board 300, to the joist 400. Where the deck connector 100 comprises one or more pins 150, the pins space the rear surface 114 of the deck connector 100 slightly away from the joist 400 before the screw is driven into the joist. Preferably, the connection aperture 140 is angled downwardly so that the screw 200 is also angled downwardly within the connection aperture 140. In this arrangement, the downward angle of the screw 200 and the angled pin(s) 150 help to ensure that the deck connector 100 is pulled downward when the screw 200 is driven into the joist 400. As the deck connector 100 is pulled downward, the engaged flange 121a of the deck connector 100 pulls on the first deck board 300a so that the first deck board 300a is pulled downward onto the joist 400. The screw or other fastener 200 may be configured to hold the first deck board 300a against the joist 400 under constant downward tension.

(c) A second deck board is then pushed against the deck connector 100 so that the second flange 121b of the deck connector is located within the groove 310 of the second deck board and so that the side edge of the second deck board, that is located below the groove 310 of the second deck board, seats against the body 110 of the deck connector.

These steps (a) to (c) are repeated for the next deck connector 100 at the next joist 400 along the length of the first deck board 300a until deck connectors 100 are attached to each relevant joist 400 and to the first deck board 300a along the first inner side edge 306 of the first deck board 300a.

Once all the deck connectors 100 are fitted along the length of the first deck board 300a, the second deck board 300b is placed adjacent to the first deck board 300a and is pushed against the deck connectors 100 fitted to the first deck board 300a so that the projecting flanges 121b from the recently fitted deck connectors 100 engage with the groove(s) 310 of the inner edge of the second deck board 300b to hold the second deck board 300b against the joists 400.

Preferably, the gap between the first 300a and second deck boards 300b is defined by the thickness of the body 110 of the deck connectors 100. In a preferred form, the body 110 of each deck connector 100 has a thickness of about 4 mm, so that the gap between adjacent deck boards 300 is about 4 mm wide.

In some situations, it may be desirable to reduce the gap between adjacent deck boards 300 without altering the dimensions of the deck connector 100. This can be achieved by forming a recessed region below the groove 310 on the inner side edge(s) of the deck boards 300 into which a portion of the body of the deck connector 100 may be located. The recessed region may be formed with a router, chisel or other suitable tool or machinery. In this arrangement, it is possible to reduce the gap between adjacent deck boards 300 by providing a recessed region on the inner edge surface 306 of only one of the deck boards 300 or by providing a recessed region on the inner surfaces of both adjacent deck boards 300.

In some situations, it may be necessary to initially fix the first deck board(s) 300 along one side of a deck to two or more joists 400 using any suitable, known form of attachment, such as by screwing or nailing the first deck board(s) 300 to the joist 400. The first deck board(s) will form one side of the deck. Each of the first deck boards 300 may also be attached to joists 400 and to an adjacent second deck board using deck connectors 100, as described above. Similarly, it may be preferred to also attach the deck board(s) 300 at the other side of the deck to joists 400 using known forms of attachment, such as by screwing or nailing the deck board(s) 300 to the joists 400.

The deck connector of the present invention offers several advantages over known systems for attaching decking members to support members. For example, the angled connection aperture 140 and angled pin(s) 150 of the deck connector 100 of the present invention allow deck boards 300 to be held against joists 400 under constant tension.

The deck connector 100 also allows deck boards 300 to be held in place with only one screw or fastener 200 per attachment region, which reduces material costs and time. Contrast this with systems where at least two screws are used to attach a deck board to each joist.

Furthermore, the deck connector 100 of the invention allows the screws/fasteners 200 to be substantially hidden from view because the screws/fasteners 200 are located below the upper surface of the deck.

Any screws or other fasteners 200 used with the deck connector 100 of the present invention may be held under shear because each fastener is inserted into the joist at an angle due to the angled connection aperture 140. Therefore, the upward pull of the deck boards 300 acts along the length of the angled fasteners 200 and places the fasteners under shear. If each fastener 200 was instead driven down into the joist 400 in a vertical position, as in the prior art, the upward pull of the deck boards 300 acts on the end of the fastener 200 and on the thread of the fastener 200, which is a smaller surface area than the length of the fastener. Therefore, by angling each fastener 200 using the deck connector 100 of the present invention, the attachment with the joist 400 is stronger than that of known deck connectors that have a vertically aligned fastener.

Another advantage of the deck connector 100 of the present invention is its ease of installation. It is not necessary to work below the deck to install the deck connector or deck boards. Instead, all installation steps may be undertaken by someone standing next to or above the deck boards and joists.

In addition, the deck connector 100 of the present invention provides accurate control of the spacing between deck boards 300 by using the thickness of the deck connector body 110 as a spacer between adjacent deck boards 300.

Yet another advantage of the deck connector 100 of the present invention is that because the deck connector is screwed into the side of joists, rather than into the top of a joist, the connector 100 can be used with deck boards 300 of different thicknesses. For example, by providing the groove(s) 310 on the side edge(s) 306 of each deck board 300 at the appropriate distance from the bottom surface of the deck board 300 to allow a flange 121a, 121b of the deck connector 100 to engage with the groove 310 of the deck board 300 and to allow a fastener 200 to extend through the connection aperture 140 of the deck connector 100 to attach the deck connector 100 to a joist 400, then deck boards of any thickness can be used with the deck connector 100.

The deck connector 100 of the present invention also allows at least some repositioning of the deck boards after installation. For example, as the deck boards dry and shrink over time, the gap between adjacent deck boards may start to vary. To some extent any variation in the gap may be overcome by pushing one or both adjacent deck boards back into a desired position in relation to each other (i.e. pushing the deck boards toward or away from each other to provide a substantially even gap along the length of the deck boards and across the width of the deck. Such sideways movement may be accommodated by the deck connector 100 of the invention because the connector 100 is configured to project into a groove formed at the side edges of the deck boards and is not fixed to the deck boards.

Extensive shrinkage can also be accommodated due to the deck connector being able to swivel slightly about the fastener at the connection with the joist, due to only one fastener being used to attach the connector 100 to the joist. By swivelling the deck connector slightly, realignment of gaps due to excessive shrinkage is possible. This is not possible with decking or deck connectors fixed to the top of support members.

The drying timber of the deck boards may also cause the deck boards to have a tendency to curve up at the sides. The configuration of the deck connector 100 remains under tension and will limit upward movement.

The deck connector of the present invention also reduces the possibility of rot forming in the deck boards as a result of corrosion of the fasteners. The deck connector of the invention achieves this because each fastener for the deck connector is located on the vertical surface of the support member rather than a horizontal or top surface of the support member, as is common in the prior art.

The deck connector of the present invention loads the tension force over a large area of the deck boards and therefore the attachment system provided by the deck connector of the invention is substantially stronger with less risk of board failure at the attachment points than prior art systems where a fastener is inserted through a top surface of a deck board at one side of the deck board and is prone to causing the deck board to split.

The deck connector attachment system of the present invention also allows for the groove in the side edge of the deck boards to be located to maximise the strength of the deck boards.

Where, in the foregoing description reference has been made to integers or components having known equivalents thereof, those integers or components are herein incorporated as if individually set forth.

The disclosed methods, apparatus and systems may also be said broadly to comprise the parts, elements and features referred to or indicated in the disclosure, individually or collectively, in any or all combinations of two or more of said parts, elements or features.

Recitation of ranges herein is merely intended to serve as a shorthand method of referring individually to each separate sub-range or value falling within the range, unless otherwise indicated herein, and each separate sub-range or value is incorporated into the specification as if it were individually recited herein.

Reference to any prior art in this specification is not, and should not be taken as, an acknowledgement or any form of suggestion that that prior art forms part of the common general knowledge in the field of endeavour in any country in the world.

Although the present disclosure has been described in terms of certain embodiments, other embodiments apparent to those of ordinary skill in the art also are within the scope of this disclosure. For example, in some forms, the deck connector may comprise two or more connection apertures. Each connection aperture may be within the same fastener region or boss, or within separate fastener regions/bosses located on the body of the deck connector. Thus, various changes and modifications may be made without departing from the spirit and scope of the disclosure. For instance, various components may be repositioned as desired. Moreover, not all of the features, aspects and advantages are necessarily required to practice the present disclosure. Accordingly, the scope of the present disclosure is intended to be defined only by the claims that follow.

The invention claimed is:

1. A deck connector for attaching a deck board to a support member, the deck connector comprising:
    a body configured to space adjacent decking members apart, wherein the body comprises a first end and a second end, a first side and a substantially opposing second side, and front and rear surfaces spanning between the first and second sides of the body, wherein the body further comprises a first flange projecting beyond the first side of the body and a second flange projecting beyond the second side of the body, wherein the flanges are provided at or near the first end of the body;
    a boss comprising a front surface and a generally opposing rear surface and a connection aperture that extends downwardly from the front surface of the boss toward the rear surface of the boss to receive a downwardly angled fastener,
    wherein the connection aperture has a generally elliptical profile at the front surface of the boss and wherein the front surface of the boss comprises a generally flat central region located between two side regions, wherein each of the two side regions is angled away from the central region;
    a skeg extending between the boss and the second end of the deck connector; and
    at least one pin projecting from the rear surface of the body to initially space the rear surface of the body from the support member during installation, wherein the at least one pin is downwardly angled to embed into the support member as the fastener is inserted through the connection aperture and into the support member to pull the deck board down against the support member under tension.

2. The deck connector of claim 1, wherein the at least one pin comprises an upper surface that is angled downwardly in a direction from the first end of the body toward the second end and outwardly away from the rear surface of the body.

3. The deck connector of claim 1, wherein the boss is substantially cylindrical and the connection aperture is substantially centrally located within the boss.

4. The deck connector of claim 1, wherein the deck connector body is substantially planar along at least a portion of its length.

5. The deck connector of claim 1, wherein the deck connector comprises a substantially oblong flanged plate at its first end, and wherein the first and second flanges form sides of the plate.

6. The deck connector of claim 5, wherein the flanged plate comprises a substantially elliptical, planar plate.

7. The deck connector of claim 1, wherein the deck connector body comprises:
   a. a spine having a first end that forms the first end of the deck connector body and a second end;
   b. a fastener region located at the second end of the spine and in which the boss and the connection aperture are located; and
   c. the skeg located beneath the fastener region, wherein the at least one downwardly angled pin is located on a rear surface of the spine and further comprising at least one other downwardly angled pin located on a rear surface of the skeg.

8. The deck connector of claim 7, wherein the skeg lies in substantially the same vertical plane as the spine.

9. The deck connector of claim 7, wherein the spine, the fastener region and the skeg each have a rear surface and wherein the rear surfaces of the spine, the fastener region and the skeg lie in substantially the same vertical plane.

10. The deck connector of claim 1, wherein the boss extends downwardly at an angle between the front and rear surfaces of the deck connector body.

11. The deck connector of claim 1, wherein the connection aperture has a circular profile at the rear surface of the boss.

12. The deck connector of claim 1, wherein the deck connector is formed from plastic or glass reinforced nylon.

13. A method of attaching a pair of decking members to a support member using a deck connector, wherein the method comprises the steps of:

(a) providing a first and a second decking member, each decking member comprising a substantially horizontal groove along a longitudinal edge of the decking member;

(b) placing the first and second decking members in a side by side arrangement above two or more support members so as to be supported by the support members and so that the grooved edges of the decking members face each other;

(c) using a deck connector according to claim 1 to attach the decking members to one of the support members by inserting the first flange of the deck connector into the groove of the first decking member and pushing the rear surface of the deck connector body against the support member;

(d) inserting a fastener through the connection aperture of the deck connector body and driving the fastener into the support member at an angle to pull the first decking member down against the support member under tension embedding the at least one pin in the support member; and (e) pushing the second decking member against the deck connector so that the second flange of the deck connector is located within the groove of the second decking member.

14. The method of claim 13, wherein the fastener is driven into the support member at an angle of approximately 30 to 45° from horizontal.

15. The method of claim 13, wherein the fastener is a screw.

* * * * *